United States Patent [19]

Morrone

[11] 3,853,689

[45] Dec. 10, 1974

[54] SAG RESISTANT GYPSUM BOARD AND METHOD

[75] Inventor: Nicholas Francis Morrone, Flemington, N.J.

[73] Assignee: Johns-Manville Corporation, New York, N.Y.

[22] Filed: June 1, 1972

[21] Appl. No.: 258,685

[52] U.S. Cl................ 161/182, 156/39, 161/270, 161/250
[51] Int. Cl............................................. B32b 9/06
[58] Field of Search ...... 161/250, 270, 182; 156/41, 156/42, 43; 106/111

[56] References Cited
UNITED STATES PATENTS

| | | | |
|---|---|---|---|
| 2,913,346 | 11/1959 | Hoffman | 106/111 |
| 3,190,787 | 6/1965 | Muller et al. | 161/270 |
| 3,393,116 | 7/1968 | Larson | 106/111 |
| 3,577,248 | 5/1971 | Doan et al. | 156/43 |
| 3,649,319 | 3/1972 | Smith | 106/111 |

*Primary Examiner*—George F. Lesmes
*Assistant Examiner*—William R. Dixon, Jr.
*Attorney, Agent, or Firm*—Robert M. Krone; Steve C. Shear

[57] ABSTRACT

The sag resistance of gypsum board is improved by incorporating a small amount of polyvinyl alcohol in the gypsum core of the board.

3 Claims, 1 Drawing Figure

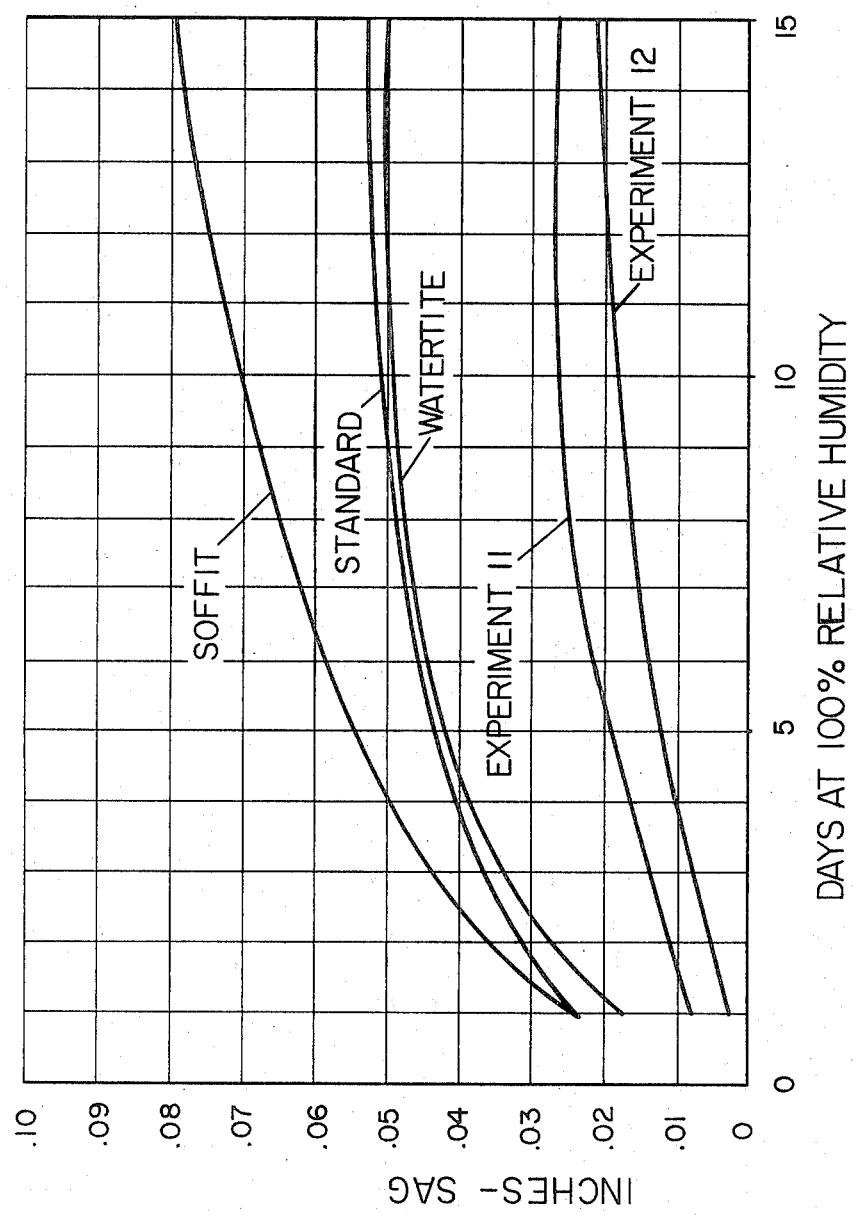

3,853,689

SAG RESISTANT GYPSUM BOARD AND METHOD

BACKGROUND OF THE INVENTION

FIELD OF THE INVENTION

This invention relates to improved board products and methods for making such products, and more particularly, relates to the production of gypsum boards having improved properties for use in areas subject to indirect exposure to the elements.

Gypsum board products comprising a monolithic core of set gypsum and a pair of paper cover sheets attached to the faces of the gypsum core are widely used in the construction of interior walls and ceilings. These products are commonly referred to as gypsum board or plaster board. Various attempts have also been made to produce a moisture-resistant gypsum board suitable for use on the exteriors of buildings in areas not directly exposed to the elements such as on soffits, on the underside of walkways, canopies and similar areas. These attempts have included providing improved waterproof paper at the exposed face of the gypsum board, and the incorporation of asphalt or Prussian blue into the gypsum core.

While the above-described attempts at producing a sag-resistant gypsum board have resulted in products showing somewhat improved properties for use in applications subject to indirect exposure to the elements, further improvement in these properties, and particularly improved sag resistance is desirable.

OBJECTS OF THE INVENTION

It is therefore, an object of the present invention to provide a gypsum board particularly adapted for use on the exterior of a building in areas not directly exposed to the elements.

Another object of this invention is to provide a gypsum board having improved sag-resistant properties.

Yet another object of the invention is to provide a process for imparting improved sag resistant to gypsum board.

BRIEF SUMMARY OF THE INVENTION

In one embodiment, the invention provides a gypsum board comprising a core of set gypsum having incorporated therein a sag resistance-improving amount of polyvinyl alcohol, and a pair of paper cover sheets with one cover sheet adhered to each face of the core of set gypsum. Preferably, the gypsum core contains polyvinyl alcohol in an amount of from 0.150 to about 0.4 percent by weight of the gypsum in the core.

In another embodiment, the invention provides an improvement in a method of producing paper covered gypsum board having a set core of gypsum in which a foamed aqueous slurry of calcined gypsum is prepared and the slurry is deposited between paper cover sheets. The slurry and paper cover sheets are formed into boards of the desired dimensions, and the boards are dried. The improvement comprises incorporating a sag resistance-improving amount of polyvinyl alcohol in the aqueous slurry.

BRIEF DESCRIPTION OF THE DRAWING

FIG. 1 is a graph showing the relation of sag versus time for two commercial gypsum boards and two gypsum boards formed in accordance with the invention.

DESCRIPTION OF THE PREFERRED EMBODIMENT

In accordance with the invention, an improvement is provided in the conventional process for making gypsum board which imparts improved sag resistance to the gypsum wall board. The improvement comprises introducing a small amount of polyvinyl alcohol which is fed as a dry or wet ingredient to the conventional pin mixer. Preferably, from 0.2 to 0.4 parts of polyvinyl alcohol per 100 parts of gypsum stucco are incorporated in the aqueous slurry used to form the gypsum core. The terms "gypsum stucco" and "stucco" as used in the specification and claims refer to the hemihydrate ($CaSO_4 \cdot \frac{1}{2} H_2O$).

No significant difference in compressive strength under humid conditions has been shown to result from increasing the polyvinyl alcohol content above about 1.0% based on gypsum stucco weight.

Preferred polyvinyl alcohol resins for incorporation into the gypsum board have an average molecular weight of about 5,000–15,000, and have a residual polyvinyl acetate content of about 15–25 percent by weight. These preferred polyvinyl alcohol resins are referred to as partially hydrolyzed resins. Presently, optimum results are achieved using a resin having an average molecular weight of about 10,000 and having a residual polyvinyl acetate content of about 19.5–21.5 percent by weight.

Conventional additives such as foams, set control agents, bonding agents and the like can be employed in the usual manner in forming the gypsum board.

An aqueous slurry of calcined gypsum can be prepared and the polyvinyl alcohol added thereto in a desired amount. Foam can then be added to reduce the density of the slurry with the resulting slurry being deposited between the cover sheets of paper and the like. The gypsum boards can be prepared in any desired thickness, for example ¼ inch to ⅝ inch in thickness, as in common in the making of building materials. The gypsum board can be produced in various sizes and various types of cover sheets can be employed to encase the board.

For a clearer understanding of the invention, specific examples are set forth below. These examples are intended to be illustrative and should not be understood as limiting the scope and underlying principles of the invention in any way. All percentages listed in the specification and claims are weight percentages unless otherwise noted.

EXAMPLE 1–10

Several gypsum formulations are prepared and evaluated which incorporate polyvinyl alcohol as an additive to improve moisture resistance.

These formulations are evaluated for moisture resistance by forming 2 × 2 × 2 inch cubes, drying them at 110°F, conditioning them in a calcium chloride desicator for 16 hours, subjecting them to 90 percent relative humidity for 48 hours, and then performing compressive strength tests on them.

The humidified compressive strength test results are shown below in Table 1. These results show that the incorporation of low weight percentages of polyvinyl alcohol produces significant increases in compressive strength after exposure to high humidity.

Table 1

| Ex. Composition | Compressive Strength of Humidified Cubes Containing Polyvinyl Alcohol | | | | | | | | | |
|---|---|---|---|---|---|---|---|---|---|---|
| | 1 | 2 | 3 | 4 | 5 | 6 | 7 | 8 | 9 | 10 |
| Stucco, gms | 600 | 600 | 600 | 600 | 600 | 600 | 600 | 600 | 600 | 600 |
| Polyvinyl Alcohol, gms (Gelvatol 20-30 BP, molecular wt. about 10,000, % residual polyvinyl acetate 19.5-21.5%, sold by Monsanto) | 0 | .25 | 0.5 | 1.0 | 1.5 | 2.0 | 2.5 | 6 | 12 | 18 |
| Starch, gms | 3 | 3 | 3 | 3 | 3 | 3 | 3 | 3 | 3 | 3 |
| Foam, ml | 250 | 250 | 250 | 250 | 250 | 250 | 250 | 250 | 250 | 250 |
| Water, gms | 400 | 400 | 400 | 400 | 400 | 400 | 400 | 400 | 400 | 400 |
| Set Time, min. | 12 | 13 | 12 | 13 | 16 | 14 | 14 | 13 | 14 | 14 |
| Density, PCF | 41.6 | 41.0 | 42.0 | 41.1 | 40.4 | 40.3 | 40.9 | 41.7 | 39.9 | 39.6 |
| Compressive | 358 | 404 | 420 | 446 | 445 | 430 | 435 | 473 | 440 | 475 |

EXAMPLES 11 and 12

Sag resistance which is by far the most important property for gypsum board products to be used in areas subject to indirect exposure to the elements is evaluated by casting ½ inch boards, cutting them into 3 × 12 inch samples, and measuring the sag of the end suspended samples with a depth gage daily under fog room (100 percent relative humidity) conditions.

Standard manila face paper is used to form the board of Examples 11 and 12. The paper has a thickness of 0.022 inch, and weighs 72 lbs/1,000 sq. ft.

The gypsum core of these Examples contains 3 and 6 lbs of polyvinyl alcohol (Gelvitol 20-30 BP) per 1,800 pounds of gypsum stucco.

FIG. 1 compares the sag resistance of the boards of Examples 11 and 12 with the sag resistance of two commercially sold, ½inch gypsum boards, including one board sold as a soffit board.

Sag resistance was greatly improved by the introduction of polyvinyl alcohol. The formulations of Examples 11 and 12 which contain polyvinyl alcohol possess superior sag resistance to the two samples of commercially available gypsum board that were tested.

What I claim is:

1. A gypsum board comprising a core of set gypsum having incorporated therein polyvinyl alcohol in an amount of from approximately 0.15 to about 0.40 percent by weight of the gypsum in the core whereby to improve the sag resistance of the board, and a pair of paper cover sheets with one cover sheet adhered to each face of the core of set gypsum.

2. The gypsum board of claim 1 in which the gypsum core contains about 0.33 percent polyvinyl alcohol.

3. The gypsum board of claim 1 in which the molecular weight of the polyvinyl alcohol is from 5,000 – 15,000, and the polyvinyl alcohol has a residual polyvinyl acetate content of 15-25 percent by weight.

* * * * *